(12) United States Patent
Bhattacharjee et al.

(10) Patent No.: US 7,512,747 B2
(45) Date of Patent: Mar. 31, 2009

(54) METHOD AND APPARATUS FOR EFFICIENTLY SUPPORTING MULTIPLE ONE-TIME TABLE ACCESS OPERATIONS IN A HIERARCHICAL MEMORY SETTING

(75) Inventors: Bishwaranjan Bhattacharjee, Yorktown Heights, NY (US); Christian Alexander Lang, New York, NY (US); Timothy Ray Malkemus, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 11/404,966

(22) Filed: Apr. 14, 2006

(65) Prior Publication Data
US 2007/0245079 A1 Oct. 18, 2007

(51) Int. Cl.
*G06F 12/06* (2006.01)
(52) U.S. Cl. .................. 711/150; 711/168; 711/148
(58) Field of Classification Search ......... 711/169, 711/148, 152, 158, 151, 167, 150; 709/224, 709/228
See application file for complete search history.

(56) References Cited
U.S. PATENT DOCUMENTS

2005/0149629 A1* 7/2005 Kidd et al. ............ 709/224

2007/0220148 A1* 9/2007 Ganesan et al. ............ 709/226

OTHER PUBLICATIONS

Giovanni Maria Sacco and Mario Schkolnick, A Mechanism for Managing the Buffer Pool in a Relational Database System Using the Hot Set Model.
Prasan Roy, S. Seshadri, S. Sudarshan, Siddhesh Bhobe, Efficient and Extensible Algorithms for Multi Query Optimization.
John T. Robinson, Murthy V. Devarakonda, Data Cache Management Using Frequency-Based Replacement.
Elizabeth J. O'Neil, Patrick E. O'Neil, Gerhard Weikum, The LRU-K Page Replacement Algorithm for Database Disk Buffering.
Nimrod Megiddo, Dharmendra S. Modha, Outperforming LRU with an Adaptive Replacement Cache Algorithm.
Donghee Lee, Jongmoo Choi, Jong-Hun Kim, et al., LRFU: A Spectrum of Policies that Subsumes the Least Recently Used and Least Frequently Used Policies.

(Continued)

*Primary Examiner*—Pierre-Michel Bataille
(74) *Attorney, Agent, or Firm*—Michael J. Buchenhorner; Vazken Alexanian

(57) ABSTRACT

An embodiment of the present invention provides a computer system including a first memory and a second memory, where the first memory is substantially faster than the second memory. A method includes steps of: inspecting a request queue for block requests from a plurality of concurrent calling processes, the request queue including a plurality of block requests not yet processed by any of the plurality of concurrent calling processes; retrieving one of the plurality of block requests, wherein each block is accessed at most once by each calling process; determining whether the retrieved block request can be fulfilled from the first memory; and returning the retrieved block to the calling process whose state indicates that the block is needed if the retrieved block request can be fulfilled from the first memory.

9 Claims, 6 Drawing Sheets

OTHER PUBLICATIONS

Theodore Johnson, Dennis Shasha, 2Q: A Low Overhead High Performance Buffer Management Replacement Algorithm.

Stavros Harizopoulos, Vladislav Shkapenyuk, Anastassia Ailamaki, QPipe: A Simultaneously Pipelined Relational Query Engine.

Phillip M. Fernandez, Red Brick Warehouse: A Read-Mostly RDBMS for Open SMP Platforms.

Hong-Tai Chou, David J. DeWitt, An Evaluation of Buffer Management Strategies for Relational Database Systems.

Ramesh Bhashyam, Technology Challenges in a Data Warehouse.

L. A. Belady, A Study of Replacement Algorithms for a Virtual-Storage Computer.

Junho Shim, Peter Scheuermann, Radek Vingralek, Dynamic Caching of Query Results for Decision Support Systems.

\* cited by examiner

METHOD AND APPARATUS FOR EFFICIENTLY SUPPORTING MULTIPLE ONE-TIME TABLE ACCESS OPERATIONS IN A HIERARCHICAL MEMORY SETTING

FIELD OF THE INVENTION

The present invention relates to accessing sets of data items, referred to as tables. More specifically, the invention supports multiple concurrent operations that require each item in such a table to be accessed at most once. It assumes a memory hierarchy consisting of at least two layers: a slow memory (e.g., disk) connected to a fast memory (e.g., RAM).

BACKGROUND

Different techniques have been used for increasing cache locality for various workloads. One of the oldest and most basic algorithms is LRU (least recently used) which evicts the page from the cache that was not accessed the longest. LRU is currently the policy of choice in many database systems due to its small overhead and tuning-free operation. Many variants of LRU have been used since. Examples are LRU-K [E. J. O'Neil, P. E. O'Neil, and G. Weikum, "The LRU-K Page Replacement Algorithm For Database Disk Buffering," Proc. ACM SIGMOD Int. Conf. on Management of Data, pages 297-306, 1993] (which evicts the page whose Kth most recent access is the longest in the past), 2Q [T. Johnson and D. Shasha, "2Q: A Low Overhead High Performance Buffer Management Replacement Algorithm," Proc. Int. Conf. on Very Large Data Bases, pages 439-450, 1994] (which reduces LRU-K's logarithmic overhead to a constant overhead), LFU [J. Robinson and M. Devarakonda, "Data Cache Management Using Frequency-Based Replacement," Proc. ACM SIGMETRICS Conf., pages 134-142, 1990] (which evicts the page that was accessed least frequently), and hybrids such as LRFU [D. Lee, J. Choi, J.-H. Kim, S. H. Noh, S. L. Min, Y. Cho, and C. S. Kim, LRFU: A Spectrum Of Policies That Subsumes The Least Recently Used And Least Frequently Used Policies, IEEE Trans. Computers, 50(12):1352-1360, 2001] (combining LRU and LFU) and ARC [N. Megiddo and D. Modha, "Outperforming LRU With An Adaptive Replacement Cache," 2004] (which can adaptively switch between different eviction policies). [L. Belady, "A study of replacement algorithms for virtual storage computers" IBM Systems Journal, 5(2):78-101, 1966] gave an optimal offline algorithm, MIN, for the cache replacement problem which evicts the page that is accessed the farthest in the future. All these techniques (1) assume the workload consists of requests for specific pages and (2) are very general (i.e., work for any such workload).

There are systems that exploit knowledge about the workload to improve caching. [e.g., G. M. Sacco and M. Schkolnick, "A Mechanism For Managing The Buffer Pool In A Relational Database System Using The Hot Set Model," Proc. Int. Conf. on Very Large Data Bases, pages 257-262, 1982] use this knowledge to derive the "hot set" of pages during query execution. This can then be used to schedule queries in a smart way to prevent unnecessary page swapping. Chou and DeWitt [H. Chou and D. DeWitt, "An Evaluation Of Buffer Management Strategies For Relational Database Systems," Proc. Int. Conf. on Very Large Data Bases, pages 127-141, 1985] improve upon this technique by using multiple page buffers, each with its own eviction policy based on the type of access (table scan, index access, etc). Both of these techniques can reduce the amount of cache misses.

Commercial database vendors such as Red Brick [P. M. Fernandez, "Red brick warehouse: a read-mostly RDBMS for open SMP platforms," Proc. ACM SIGMOD Int. Conf. on Management of Data, page 492, 1994] and Teradata [T. Walter, "Explaining cache—NCR CTO Todd Walter answers your trickiest questions on Teradata's caching functionality"] employ proprietary algorithms to let the database synchronize multiple table scan operations in order to maximize buffer locality. This idea was taken even further by Harizopoulos et al. [S. Harizopoulos, V. Shkapenyuk, and A. Ailamaki. QPipe, "A simultaneously pipelined relational query engine," Proc. ACM SIGMOD Int. Conf. on Management of Data, pages 383-394, 2005]. They propose interesting ideas for a new database architecture that tries to maximize reuse of partial query results from the query down to the page access level. This is achieved by detecting overlaps in active query plan operators at query execution time and then exploiting it by pipelining one operator's results to all dependent operators where possible. Two of the operators discussed in that paper are the table and index scan operators. For these, the authors propose to use one scan thread that keeps scanning all pages while table scan operators can attach to and detach from this thread in order to share the scanned pages.

While this approach works well for scans with similar speeds, in practice scan speeds can vary by large margins and even single scans' speeds are usually far from constant due to changes in predicate evaluation overhead. Therefore, the benefit can be lower as scans may start drifting apart.

In addition to cache or page buffer algorithm improvements, other methods to reduce disk access costs for multiple concurrent queries with overlapping data accesses have been investigated. These methods include multi-query optimization [P. Roy, S. Seshadri, S. Sudarshan, and S. Bhobe. Efficient and extensible algorithms for multi query optimization. In Proc. ACM SIGMOD Int. Conf. on Management of Data, pages 249-260, 2000] (which requires all queries to be known in advance) and query result caching [J. Shim, P. Scheuermann, and R. Vingralek. Dynamic caching of query results for decision support systems. In Proc. Int. Conf. on Scientific and Statistical Database Management, pages 254-263, 1999]. Due to being at a high level of the query execution hierarchy, the latter may miss out on sharing potential for queries that have very different predicates but still end up performing table scans on the same table, for example.

In summary, existing approaches for reducing disk accesses during the execution of multiple queries are either not dynamic enough, or are limiting themselves by enforcing certain access orders or not making full use of the knowledge about the workload.

SUMMARY

An embodiment of the present invention provides a computer system comprising a first memory and a second memory, where the first memory is substantially faster than second and that performs a method includes steps of: receiving requests for blocks from scan processes; serializing requests for blocks with a request queue; inspecting requests, with a request handler process, R, for blocks and determining whether the requests can be fulfilled from the first memory, if possible; and using an interface for: getting a next data item not yet processed by a calling process, starting a new one-time table access operation, and ending one-time table access operation.

DETAILED DESCRIPTION

Figure 1:
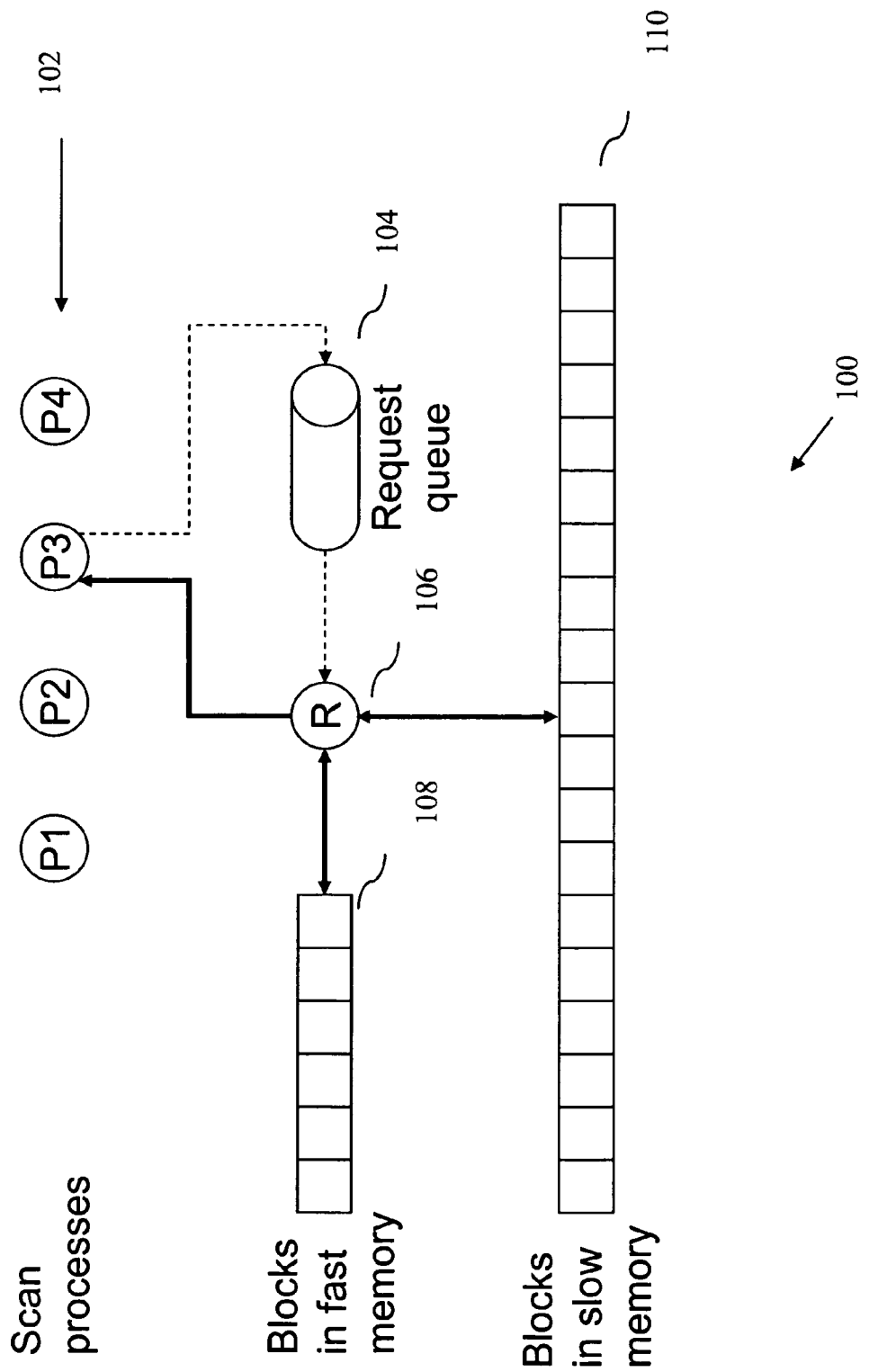
FIG. 1 is schematic representation of an embodiment of a system with one request queue into which the present invention can be integrated.

In the following discussion, we will refer to one-time table accesses also as "(table) scans" or "(index) scans." Examples are queries with aggregation operations, analysis of video sequences, and the like. Furthermore, we will refer to table data items also as "(table) pages" or "blocks." Furthermore, we will refer to the slower memory as "disk" and to the faster memory as "cache." This does not mean that the invention is restricted to systems based on disks or using pages to store data.

Embodiments of the invention improve caching of tables (i.e., loading, retaining, and accessing of table data items in fast memory rather than slow memory) to reduce the disk access cost of concurrent queries that involve one-time table accesses.

We achieve this reduction through a caching methodology that coordinates the sharing between ongoing scans to reduce redundancy of accesses. This new methodology is based on policies for deciding which pages to swap in, swap out, and return to a query process. Each of these policies is based on knowledge about the set of pages still needed by ongoing scan operations. Due to its additional policies and knowledge, the proposed caching algorithms can result in better caching performance than the standard cache replacement algorithms. Further, the proposed caching system can be easily integrated in existing database architectures.

The tables are assumed to be stored in the slow memory, while the access to the table items requires those items to be brought into the fast memory. The invention details algorithms for scheduling the access to data items and the movement of data items between the memory hierarchy layers-with the overall goal to minimize the number of accesses to the slow memory while serving all outstanding table access operations.

General Caching Models and Processes

We now discuss two caching models targeted specifically at table access operations that require each table page to be accessed at most once (such as for scans). At the same time, these models are close to current database cache architectures thereby allowing an easy integration. For this invention, we assume that relational table and index scan processes (or "scans") can process pages in any order. Multiple sequential pages are accessed together in blocks to decrease seek time. The size of a block is ideally the maximum amount of pages readable by the disk controller in one read operation. In the following we assume all requests and disk accesses are performed at block granularity. Each scan keeps requesting new blocks until it has accessed all blocks of a table. The requests are of the form "give me any table block that I have not processed yet." The caching system has the freedom to return any of the unprocessed blocks to the caller. This is fundamentally different from traditional caching models where requests are of the form "give me table block b." Since the load on the disk affects directly the query throughput, the goal of the caching system is then to minimize the overall number of disk accesses necessary to fulfill the block requests. At the same time, the system should allow scans to join and leave dynamically. In the next sections, we consider two different models: the one queue caching model and the two queue caching model.

An embodiment of the invention decides on the page or block access order instead of leaving this decision to the requesters. In addition, the embodiment makes use of "future" knowledge specific to the scan workload (namely, which blocks will still be needed by a scan). The embodiment assumes (1) the caching system has control over which page or block to return next to a requester and (2) the workload is specific to a database table or index scan operation (each requester reads each page or block only once).

One Queue Caching Model

Referring to FIG. 1, there is shown an information processing system 100 into which a caching system according to the invention can be integrated. In this embodiment, new scan processes (denoted by P1, P4) 102 register with the cache system, indicating which blocks they need. The cache system keeps track of the set of pages needed by all ongoing scans (their "state"). Block requests from scan processes are serialized through a request queue 104. This queue is serviced by a request handler processor (e.g., any processor configured to execute a process, denoted by R) 106 which inspects requests from the queue 104 and checks whether any of them can be fulfilled with the current cache 108 content. If that is possible, R 104 returns the block to the requesters 102 whose state indicates that they still need the block. If the request cannot be fulfilled with the cache 108 content (i.e., if the requester does not need any of the blocks currently in the cache), R 106 selects a block from disk 10 to bring into the cache 108 (and, if the cache is full, a block to swap out) and return to the appropriate requesters. Once the block is returned, R 106 considers the next request. This embodiment is also referred to as a "blocking model" because no other requests from the request queue 104 are handled while R 106 is waiting for the disk I/O operation to complete.

Two Queue Caching Model

Figure 2:
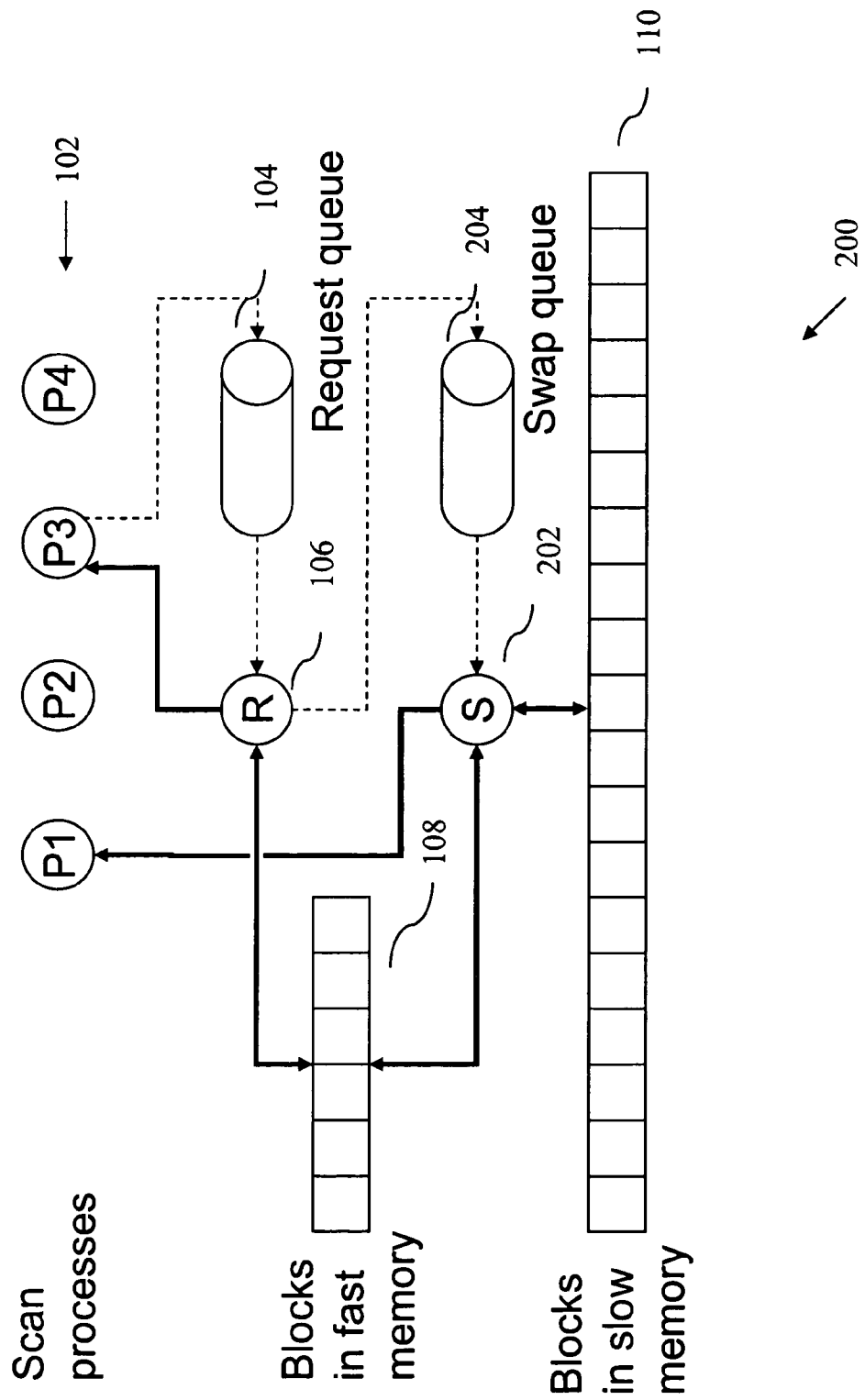
FIG. 2 is a schematic representation of an embodiment of a system with two request queues into which the present invention can be integrated.

Referring to FIG. 2, there is shown a schematic representation of an embodiment of a system 200 with two request queues 104 and 204 into which the present invention can be integrated. In this embodiment, block requests 102 are again serialized through the request queue 104. However, the request handler process R 106 can now either return a block from cache to the requesters (as in the blocking model), or, if no needed blocks are in cache, it can add the request to the queue of a separate swapper processor (denoted by S 202) and then continue working on its own queue 204. The swapper process S 202 continuously inspects its swap request queue 204 and decides based on the queue's content which block to bring into the cache from disk and which block to swap out from cache if necessary. Once a block is brought into the cache, it is returned to the requesters that need this block (in this example only P1) and the next request in the swap queue is considered.

This model is also referred to as a "non-blocking model" in the sense that other requests from the request queue are not blocked by ongoing I/O operations due to the splitting in two separate handler processes. Process R 106 can handle requests while process S 202 is waiting for the current disk I/O operation to complete.

The next block returned to a requester can be any block of the table, as long as it has not been processed by that requester yet. This additional degree of freedom allows for significant increases in the amount of shared pages or blocks.

Interface

The interface to the caching system 100 consists of three functions:

(1) "Start new scan": indicates to the system that a new scan starts. This new scan still needs to read all blocks; therefore all blocks are marked as "not processed yet" by the caching system (2) "End scan": indicates that a scan is finished. This causes the caching system to mark all blocks as "processed;" and (3) "Get next data item that has not been processed by the caller": indicates that the caller is ready to process the next block. This function can inspect request queues, the cache content, and per-scan information on processed blocks to decide which block to return to the caller and/or which block(s) to swap in from the slower memory or discard from the faster memory.

Request Handler Processes

We now discuss the third function, "get next data item that has not been processed by the caller" in more detail. Each such data request is entered into the request queue 104 of process R 106.

Figure 3:
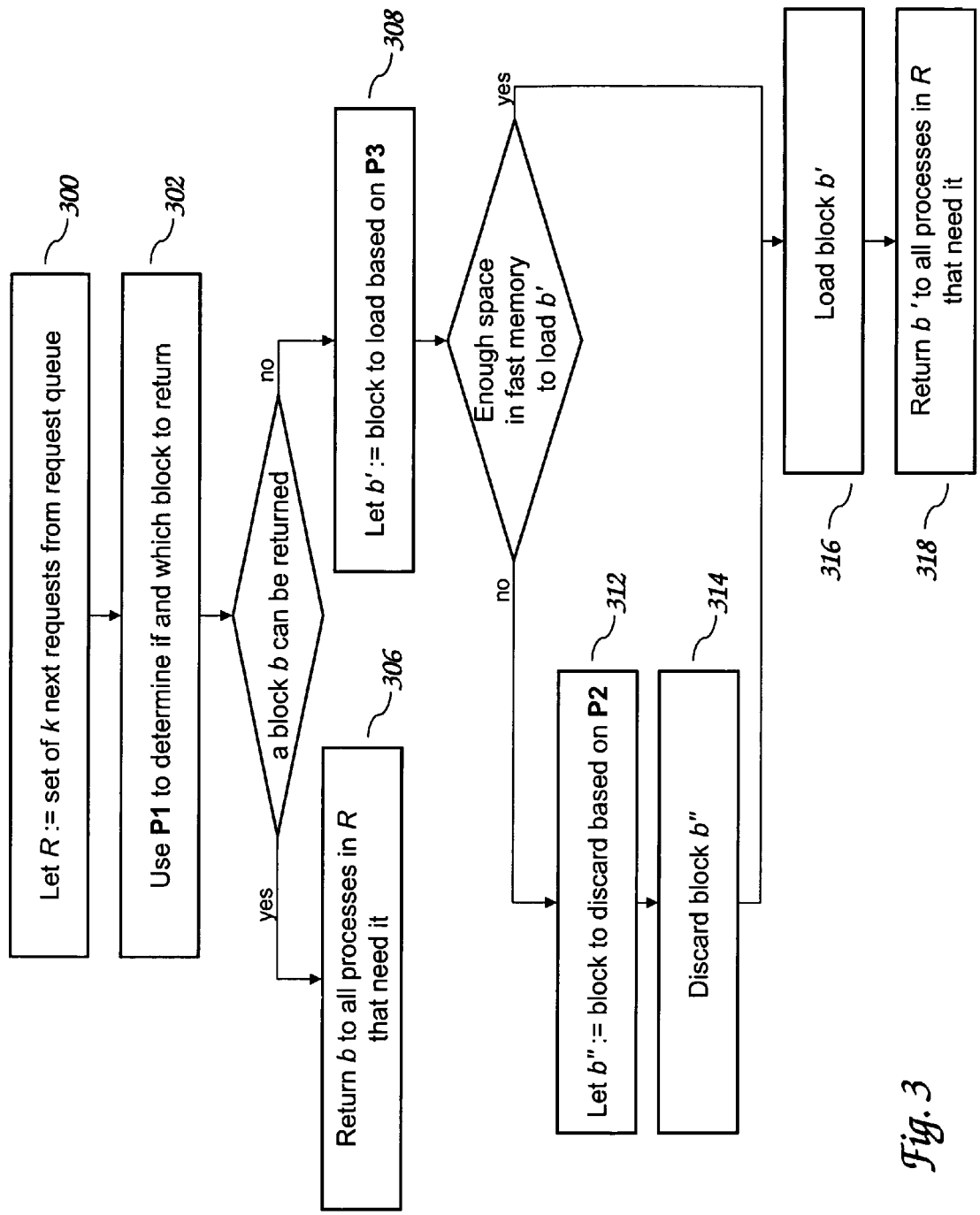
FIG. 3 is a flow chart illustrating an embodiment of a method describing the request handler process in the one-queue system.

Referring to FIG. 3 is a flow chart illustrating an embodiment of a method describing the request handler process in the one-queue system. In case of the one queue model, process R 106 behaves as described in FIG. 3. First, it determines the k next requests in the request queue 300. The value k can be any number, including "all requests". Next, it uses policy P1 to determine the next block to return from the cache (or if none is available) based on the k next requests and the state of the scan processes 302. If a block can be returned directly from the cache, it is returned to the requester (and potentially other requesters that need this block) 306. If no block in the cache can be returned, policy P3 is used to determine which block to load into cache from disk 308. If enough space is available in the cache to accommodate the block, it is loaded 316 and returned to the requester(s) 318. If not enough space is available, policy P2 is used to determine which block to discard from the cache prior to loading the new block 312. Once determined, the selected block is removed from the cache 314 and the new block is loaded 316 and returned 318.

Figure 4:
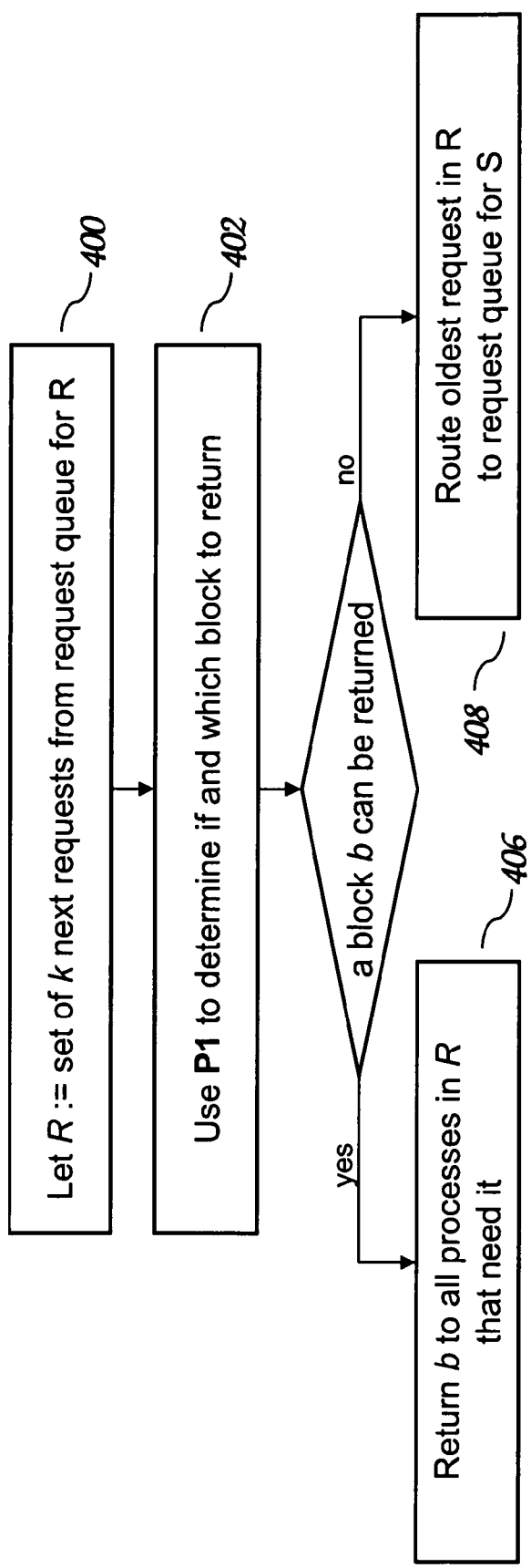
FIG. 4 is a flow chart illustrating an embodiment of a method describing the request handler process in the two-queue system.

Referring to FIG. 4 is a flow chart illustrating an embodiment of a method describing the request handler process in the two-queue system. In case of the two queue model, there are two processes, R and S, each with its own request queue. Process R behaves as described in FIG. 4. First, it determines the k next requests in the request queue 400. The value k can be any number, including "all requests". Next, it uses policy P1 to determine the next block to return from the cache (or if none is available) based on the k next requests and the state of the scan processes 402. If a block can be returned directly from the cache, it is returned to the requester (and potentially other requesters that need this block) (406). If no block in the cache can be returned, the oldest request in R is routed to S's request queue and the next request in R's queue is considered.

Figure 5:
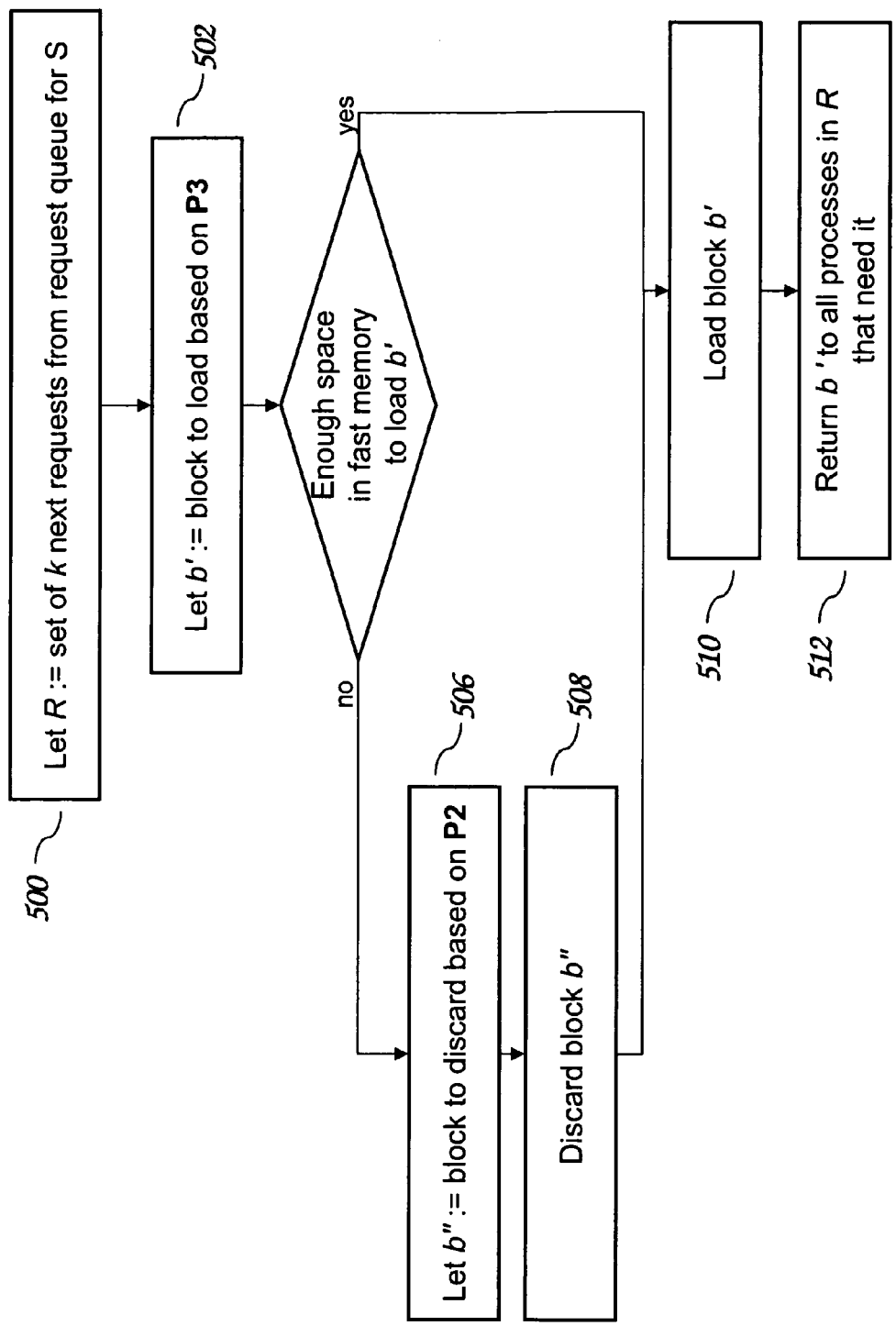
FIG. 5 is a flow chart illustrating an embodiment of a method describing the swapping process in the two-queue system.

Referring to FIG. 5 is a flow chart illustrating an embodiment of a method describing the swapping process in the two-queue system. Process S behaves as described in FIG. 5. First, it determines the next request in its queue 500. Next, policy P3 is used to determine which block to load into cache from disk 502. If enough space is available in the cache to accommodate the block, it is loaded 510 and returned to the requester(s) 512. If not enough space is available, policy P2 is used to determine which block to discard from the cache prior to loading the new block 506. Once determined, the selected block is removed from the cache 508 and the new block is loaded 510 and returned 512.

Policies

In both of the above caching models, policies for block loading and eviction used by R and S influence the overall caching efficiency. There are three policies:

(1) P1: which block in the cache to return to the requester (by process R)

(2) P2: which block to evict from the cache (by process R in the blocking model, or by process S in the non blocking model)

(3) P3: which block to swap in from disk to cache (by process R in the blocking model, or by process S in the non-blocking model)

Each policy decision is based on the current state of the cache, namely the cache content, the state of the ongoing scans, and the state of the request queues. FIGS. 3, 4, and 5 show how R and S use policies P1, P2, and P3. The parameter k indicates how far ahead each process looks in the request queues. We will later present policies for k=1 ("single pending request") and then extend them to general k ("multiple pending requests"). If some scans need to lock blocks, policies (P1) and (P2) could consider only the cached blocks that are not locked.

Index Scans

Index-based range queries are often executed in two phases. In the first phase, the index is accessed to obtain the list of record IDs to fetch. For this phase, sharing of cache content is not critical as indexes are usually much smaller than tables. In the second phase, the blocks containing the records are read from disk in increasing order of block IDs. This second phase resembles table scans that read only a subset of blocks. We therefore propose to use the same algorithms as for table scans with the only difference that the set of blocks still needed for a new scan process (its "state") is initialized to the subset selected by the index rather than the full set. We refer to such index-based table scans as "index scans" in this paper. Table scans can obviously be viewed as a special case of index scans for purposes of caching. For clarity, we concentrate on table scans in the rest of the description but the algorithms we propose are also applicable to index scans.

Caching Policies for Single Pending Request

Besides allowing for one or two queues and queue handler processes, each handler process can operate in two modes: (1) the request handler can process one request at a time or (2) the request handler can inspect all pending requests and serve one or more of them. In this section, mode (1) is discussed. The next section discusses mode (2).

We know how many more requests each scan will make based on how many of its blocks it already saw. This knowledge can be used as a replacement for the "real future knowledge" (which is not available). Conventional caching algorithms do not have the constraint that blocks are only accessed once by each process and can therefore not use this crucial trick.

We now use this knowledge to define the three policies P1, P2, and P3. At first, we observe that the latest possible time in which block b is needed overall is the minimum of the latest possible times $L\_p(b)$ for all processes p that still need b. Let this minimum be denoted by $L(b)$. $L\_p(b)$ can be approximated as follows (assuming overall time to handle all outstanding requests is 1):

$$L\_p(b) \approx |B(p)|/(|B(p)|+1)$$

where $|B(p)|$ is the number of blocks left to access for scan process p.

The reasoning behind this approximation is as follows. For a large number of scan processes with many uniformly distributed requests, the accesses of a single process are spread out uniformly across time. If the process has $|B(p)|$ blocks left to access, these accesses split the time axis into $|B(p)|+1$ approximately equal length intervals. The last access will happen at time $1/(|B(p)|+1)$ from the end of the sequence (assuming overall time is 1), or after time $1-1/(|B(p)|+1)=|B(p)|/(|B(p)|+1)$ from the beginning.

This gives us the following policies:

P1: pick the block b from cache that is still needed by the requester, such that the minimum of $(|B(p)|)/(|B(p)|+1)$ among all processes p that still need b is minimized.

P2: pick the block b from cache, such that the minimum of $(|B(p)|)/(|B(p)|+1)$ among all processes p that still need b is maximized.

P3: pick the block b from disk that is still needed by the requester, such that the minimum of $(|B(p)|)/(|B(p)|+1)$ among all processes p that still need b is minimized.

Caching Policies for Multiple Pending Requests

If the request handler is allowed to inspect multiple requests, the policies can be changed as follows:

P1: pick the block b from cache that is still needed by ANY requester, such that the minimum of $(|B(p)|)/(|B(p)|+1)$ among all processes p that still need b is minimized.

P2: pick the block b from cache, such that the minimum of $(|B(p)|)/(|B(p)|+1)$ among all processes p that still need b is maximized.

P3: pick the block b from disk that is still needed by ANY requester, such that the minimum of $(|B(p)|)/(|B(p)|+1)$ among all processes p that still need b is minimized.

The block determined by policy P1 can be returned to all requesters in need of this block.

Extension to Arbitrary Storage Hierarchies

Figure 6:
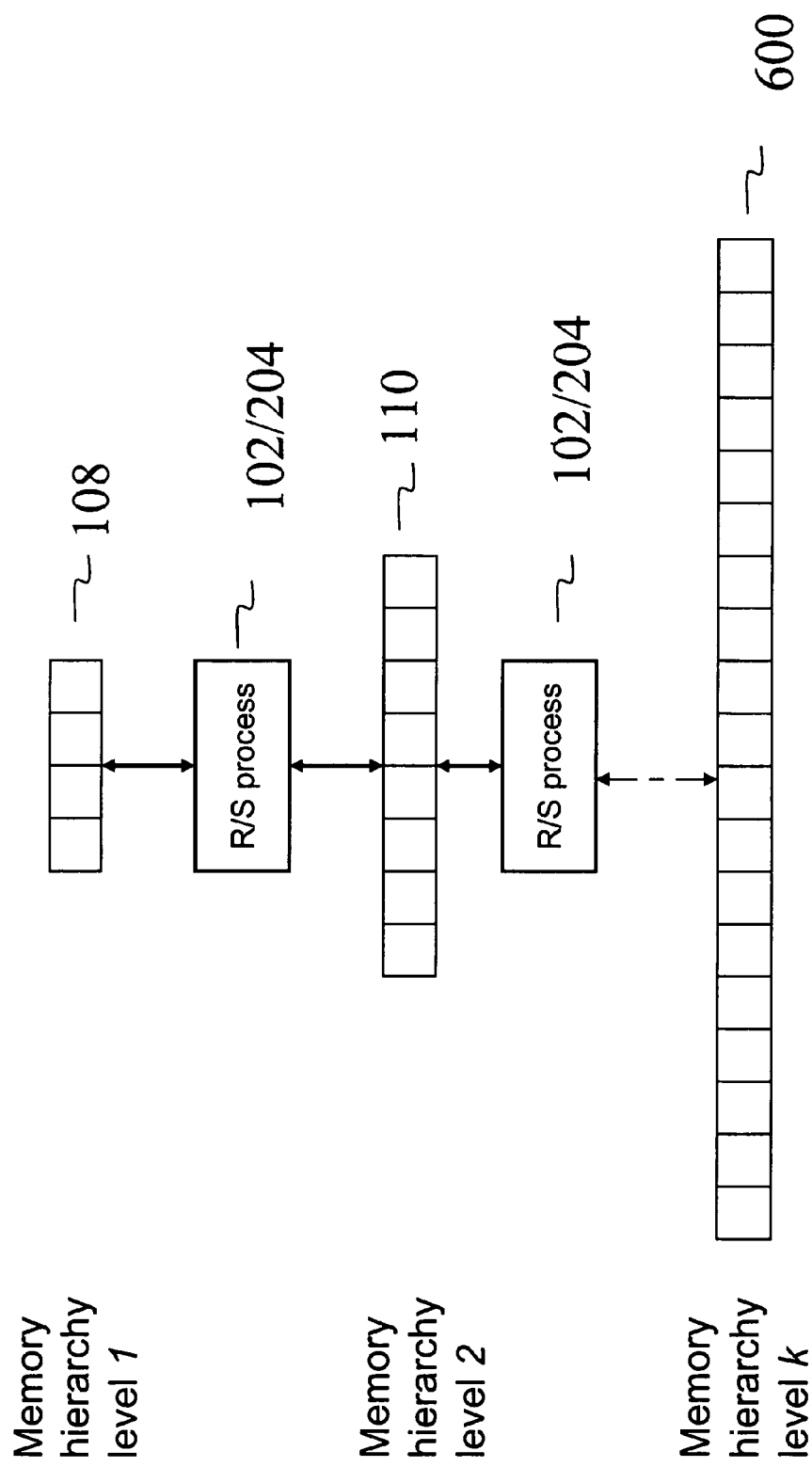
FIG. 6 is a schematic representation of an extension of the invention to support multiple layers of memory.

Referring to FIG. 6, is a schematic representation of an extension of the invention to support multiple layers of memory. The invention can operate in environments where more than two (fast and slow) storage layers are present, as follows. Let us assume k storage layers, 1, . . . , k, (three of which are shown in FIG. 6) with layer 1 being the fastest memory and layer k being the slowest. Let us also assume these layers are connected such that data can be transferred between adjacent layers. Within each layer the same algorithm as discussed above is employed. However, as soon as no more required blocks are available at layer x 600 to fulfill requests from the layer above, a request for a block is issued to layer x+1. This way, the previously discussed method is applicable to this scenario with minimal changes. Instead of having one R/S process system transferring blocks between fast and slow memory, in this extension there is one such R/S process system between each adjacent pair of memory layers. In fact, each of these R/S process systems can use its own policies.

Extension to Cost-Based Prioritization

In case access cost estimates for the storage levels are available, these can be used in the policies to further improve the overall cost. The idea is to modify $|B(p)|$ such that blocks needed by p that are in cache/fast storage get a higher weight and blocks needed by p that are on disk/slower storage get a lower weight. In other words, instead of $|B(p)|=\Sigma$blocks $b$ needed by $p$ 1, we can use $|B(p)|=\Sigma$blocks $b$ needed by $p$ $w(b)$ where $w(b)=$wfast if b is in fast storage and $w(b)=$wslow if b is in slow storage.

The values for wfast and wslow can be based on the speed of the fast and slow storage, respectively. For example, if the slow storage is 10 times slower than the fast storage, we may choose the following values:

wfast=10, wslow=1.

With this modified $|B(p)|$, the policies P1, P2, and P3 can be defined as before. This modification gives a higher priority to blocks to which most other alternatives (for processes that need this block) are in slow storage.

Extension to Process Prioritization

In order to allow for different process priorities, $|B(p)|$ can be modified by a scaling factor. Instead of $|B(p)|=\Sigma$blocks $b$ needed by $p$ 1, we can use $|B(p)|=\Sigma$blocks $b$ needed by $p$ $w(p)=w(p)*(\Sigma$blocks $b$ needed by $p$ 1)

where $w(p)$ is the "inverse priority" assigned to process p. Processes with a low "inverse priority" are considered more important than processes with a high "inverse priority". With this modified $|B(p)|$, the policies P1, P2, and P3 can be defined as before.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. In a computer system comprising a first memory and a second memory, wherein the first memory is substantially faster than the second memory, a method comprising:
   inspecting a request queue for block requests from a plurality of concurrent calling processes, the request queue comprising a plurality of block requests not yet processed by any of the plurality of concurrent calling processes, wherein each block request calls for a block of data and wherein each block is accessed at most one time by the concurrent calling processes;
   retrieving one of the plurality of block requests;
   determining whether the retrieved block request can be fulfilled with a block from the first memory; and
   if it is determined that the retrieved block request can be fulfilled with the block from the first memory:
      retrieving the block from the first memory; and
      returning the retrieved block to the calling process whose state indicates that the block is needed if the retrieved block request can be fulfilled from the first memory.

2. The method of claim 1 wherein the method is iteratively performed until all block requests are processed.

3. The method of claim 2, wherein, if the retrieved block request cannot be fulfilled from the first memory, the method further comprises steps of:
   determining which block to swap from the second memory to the first memory;
   selecting the block to swap from the second memory;
   loading the selected block into the first memory; and
   returning the loaded block to the calling process whose state indicates that the loaded block is needed.

4. The method of claim 3 further comprising a step of discarding after the selecting step, wherein the discarding step comprises:
   determining whether there is enough space in the first memory to the load the block from the second memory; and
   discarding a block from the first memory if there is not enough space in the first memory.

5. The method of claim 2 further comprising a step of forwarding the block requests to a swap queue of a separate swap process if the block requests cannot be fulfilled from the first memory.

6. The method of claim 5 wherein if the block cannot be returned to the separate swap process, the method comprises a step of routing an oldest block request in the request queue to the swap queue for routing to the separate swap process.

7. The method of claim 5 wherein the separate swap process continuously inspects the swap queue to determine which block to bring into the first memory.

8. A computer system comprising:
   a storage system comprising a plurality of storage layers comprising a slow storage layer and a fast storage layer;
   an interface that receives block requests from scan processes;
   a request queue for serializing the block requests; and
   a request handler processor that:
      inspects the request queue for block requests from the scan processes, the request queue comprising a plurality of block requests not yet processed by any of the scan processes, wherein each block request calls for a block of data and wherein each block of data is accessed at most one time by the scan processes;
      retrieving one of the plurality of block requests;
      determining whether the retrieved block request can be fulfilled with a block of data from the fast storage layer; and
      if it is determined that the retrieved block request can be fulfilled with the block of data from the fast storage layer:
         retrieving the block of data from the fast storage layer; and
         returning the retrieved block to the scan process whose state indicates that the block is needed if the retrieved block request can be fulfilled from the fast storage layer; and
      if it is determined that the block of data called for in the retrieved block request is not available in the fast storage layer:
         the request handler processor further:
            determines which block of data to swap from the slow storage layer into the fast storage layer;
            selects the block to swap from the slow storage layer;
            determines whether there is enough space in the fast storage layer to load the selected block from the slow storage layer;

discards a block from the fast storage layer if there is not enough space in the fast storage layer;

loads the selected block into the fast storage layer; and returns the loaded block to the calling process whose state indicates that the loaded block is needed.

9. A computer-readable medium comprising code that, when executed, causes a computer to perform a method comprising steps of:

inspecting a request queue for block requests from a plurality of concurrent calling processes, the request queue comprising a plurality of block requests not yet processed by any of the plurality of concurrent calling processes, wherein each block request calls for a block of data and wherein each block of data is accessed at most one time by the concurrent calling processes;

retrieving one of the plurality of block requests;

determining whether the retrieved block request can be fulfilled with a block of data from a first memory in a storage system comprising the first memory and a second memory, wherein the first memory is substantially faster than the second memory;

if it is determined that the retrieved block request can be fulfilled with the block of data from the first memory;

retrieving the block of data from the first memory; and returning the retrieved block to the calling process whose state indicates that the block is needed if the retrieved block request can be fulfilled from the first memory.

* * * * *